(12) United States Patent
Wei et al.

(10) Patent No.: US 8,448,224 B2
(45) Date of Patent: May 21, 2013

(54) INTERCEPTING MALICIOUS ACCESS

(75) Inventors: Xinguo Wei, Hangzhou (CN);
Yuanchuang Wang, Hangzhou (CN)

(73) Assignee: Alibaba Group Holding Limited,
George Town, Grand Cayman (KY)

( * ) Notice: Subject to any disclaimer, the term of this patent is extended or adjusted under 35 U.S.C. 154(b) by 164 days.

(21) Appl. No.: 12/930,927

(22) Filed: Jan. 20, 2011

(65) Prior Publication Data
US 2011/0179467 A1    Jul. 21, 2011

(30) Foreign Application Priority Data

Jan. 21, 2010   (CN) .......................... 2010 1 0001277

(51) Int. Cl.
*G06F 21/00*    (2006.01)
(52) U.S. Cl.
USPC ............... 726/3; 709/223; 709/225; 370/252; 370/235
(58) Field of Classification Search
USPC .......................................................... 726/3, 4
See application file for complete search history.

(56) References Cited

U.S. PATENT DOCUMENTS

| | | | |
|---|---|---|---|
| 7,797,411 B1 | 9/2010 | Guruswamy et al. | |
| 7,836,502 B1 | 11/2010 | Zhao et al. | |
| 7,843,829 B1 * | 11/2010 | Truong et al. | 370/235 |
| 2002/0083175 A1 | 6/2002 | Afek et al. | |
| 2002/0112185 A1 | 8/2002 | Hodges | |
| 2005/0044422 A1 * | 2/2005 | Cantrell et al. | 713/201 |
| 2007/0115850 A1 * | 5/2007 | Tsuchiya et al. | 370/252 |
| 2007/0245137 A1 | 10/2007 | Bhagat et al. | |
| 2007/0300286 A1 * | 12/2007 | Judge | 726/1 |
| 2008/0034424 A1 | 2/2008 | Overcash et al. | |
| 2008/0301812 A1 * | 12/2008 | Chow et al. | 726/24 |
| 2010/0011434 A1 * | 1/2010 | Kay | 726/14 |

OTHER PUBLICATIONS

Malici ous Mobile Threats| http://www.juniper.net/us/en/local/pdf/whitepapers/2000415-en.pdf|2010-2011|Juniper Networks Inc.|pp. 1-20.*

* cited by examiner

*Primary Examiner* — Taghi Arani
*Assistant Examiner* — Mahfuzur Rahman
(74) *Attorney, Agent, or Firm* — Van Pelt, Yi & James LLP

(57) ABSTRACT

Analyzing network access requests includes: receiving an access request for service from a user; updating a frequency of access requests associated with the user; receiving an analysis result based at least in part on the access request; determining whether the frequency of access exceeds a predetermined frequency; in the event that the frequency of access does not exceed the predetermined frequency, allowing the access request; and in the event that the frequency of access is greater than the predetermined frequency, determining whether to intercept the access request from the user based at least in part on the analysis result.

5 Claims, 3 Drawing Sheets

INTERCEPTING MALICIOUS ACCESS

CROSS REFERENCE TO OTHER APPLICATIONS

This application claims priority to People's Republic of China Patent Application No. 201010001277.8 entitled A METHOD AND SYSTEM OF INTERCEPTING MALICIOUS ACCESS filed Jan. 21, 2010 which is incorporated herein by reference for all purposes.

FIELD OF THE INVENTION

The present application relates to the field of telecommunications. In particular, it relates to a method and system of intercepting malicious access.

BACKGROUND OF THE INVENTION

In service access systems, a user terminal sends an access request to a web server and the web server provides the appropriate service to the user terminal based on the request. To increase service access security and to avoid malicious access or attacks by a user terminal, the web server needs to determine whether the user terminal is a malicious access terminal and if so, intercept the malicious access request sent by the user terminal. Typically, in determining whether to intercept transmitted information, a web server analyzes the IP addresses of the transmission (e.g., in the form of network layer information or HTTP requests) sent by user terminals. This analysis includes keeping track of the access frequency for each received IP address and determining whether the corresponding user terminal is a malicious access terminal based on this information. If the sending user terminal is determined to be a malicious access terminal, then the web server may proceed to intercept subsequent access requests from the identified user terminal. However, in these typical methods, the web server not only needs to perform normal processing of user terminal service requests, but also has to perform real-time analysis of user terminal network layer information or HTTP requests. This approach lowers the web server's service response speed and disadvantageously reduces the web server's efficiency.

BRIEF DESCRIPTION OF THE DRAWINGS

Various embodiments of the invention are disclosed in the following detailed description and the accompanying drawings.

DETAILED DESCRIPTION

Figure 1:
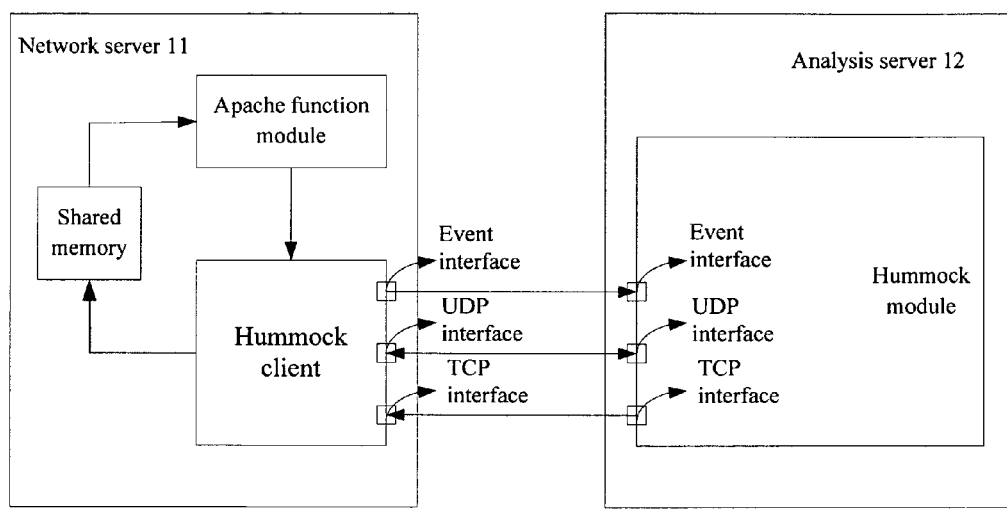
FIG. 1 is a diagram showing an embodiment of a system for intercepting malicious access.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Detection of malicious access terminals is disclosed. In various embodiments, when the network server receives an access request sent by a user terminal, if the network server is unable to determine whether the access request is from a malicious access terminal based on its available information, then network server can go ahead and grant access to the user terminal, meanwhile it asynchronously sends the access request to an analysis server. As such, the network server may respond to this access request without having to wait for analysis results to be sent back from the analysis server. After the analysis server has analyzed this access request and has obtained analysis results, it informs the network server of the analysis results. Then for subsequent access requests that it receives from the same user terminal, the network server can determine whether the access request is malicious access based on the received analysis results.

User terminals that engage in malicious access conduct are referred to as malicious access terminals. Examples of malicious access conduct directed at a web server include: a flooding of data acquisition requests, requests to register large numbers of subscribers, or the entry of large quantities of information into forms.

FIG. 1 is a diagram showing an embodiment of a system for intercepting malicious access. System 100 includes network server 11 and analysis server 12. Each server may be implemented using one or more computing devices such as a computer, a multi-processor system, a microprocessor based system, a special purpose device, a distributed computing environment including any of the foregoing systems or devices, or other appropriate hardware/software/firmware combination that includes one or more processors, and memory coupled to the processors and configured to provide the processors with instructions. In some embodiments, network server 11 and analysis 12 communicate over a network (not shown). The network may include wire line or wireless data networks and/or telecommunications networks. Analysis server 12 may provide analyses services to one or more network servers. Network server 11 also includes several modules (e.g., Apache function module, shared memory, hummock client), which are discussed further below.

Network server 11 provides services to user terminals based on access requests sent by user terminals. One example of services includes access to data stored at network server 11. Network server 11 receives access requests sent by user terminals. If the requests are not yet identified to be sent by malicious access terminals, network server 11 proceeds to grant access to the user terminals but sends the requests and/or analytic information obtained from the requests to analysis server 12. Network server 11 determines whether user terminals are malicious access terminals based on analysis results that it receives from analysis server 12. For the user terminals that are determined to be malicious access user terminals based on the analysis results sent by analysis server 12, network server 11 intercepts subsequent access requests from such user terminals. In some embodiments, network server 11 intercepts access requests and discards such requests. In some embodiments, network server 11 intercepts access requests by diverting them to a storage and subsequently analyzing the diverted requests.

In some embodiments, which user terminals are malicious access terminals are kept track in a set of interception information that can be stored in various storage devices of network server 11 or those of analysis server 12, such as memory, hard disk, and/or flash memory. In some embodiments, the interception information includes a list of malicious access terminals and identifying attribute information on the malicious access terminals. The attribute information may include, but is not limited to, terminal identifiers, IP address, cookie contents, HTTP header field-setting identifiers, and/or one or more combinations of GET data contents and POST data contents. Network server 11 may update the interception information as it receives subsequent analysis results from analysis server 12 (e.g., adding a user terminal to the list, removing a user terminal from the list, creating a new version of the interception information). For the user terminals that are not determined to be malicious access user terminals based on the analysis results sent by analysis server 12, network server 11 provides the services requested by such user terminals.

Analysis server 12 analyzes access requests sent by user terminals and determines whether the sending user terminal is a malicious access terminal. Analysis server 12 also sends its analysis results (e.g., whether one or more of the user terminals sending access requests to network server 11 are malicious access terminals) to network server 11.

In various embodiments, when network server 11 receives an access request from a user terminal that is not determined to be a malicious access terminal (e.g., the user terminal is not found on the list of malicious access terminals), network server 11 will not intercept the access request and will send the request (or a portion thereof) to analysis server 12. Analysis server 12 then performs analysis on the received access request to determine whether the user terminal that sent the request is a malicious access terminal. In some embodiments, network server 11 may wait until it receives multiple access requests, compress the unintercepted access requests, and send them to analysis server 12 all at once.

In some embodiments, a network component of network server 11 forwards access requests received at network server 11 to analysis server 12. For example, such a network component may be a physical element of network server 11 such as a network card or a separate device that is linked to network server 11 and has the capability to communicate with analysis server 12. After the network component acquires access requests from network server 11, it may forward them to analysis server 12. Alternatively, the component may directly receive access requests on behalf of network server 11 and forward the unintercepted one or more requests to analysis server 12.

In various embodiments, access requests include, but are not limited to: HTTP requests and encoded HTTP (HTTPS) requests. In some embodiments, network server 11 and/or analysis server 12 may obtain analytic information by carrying out application layer decoding of the access requests. This analytic information includes, but is not limited to, one or more combinations of the following: IP address, cookie contents, HTTP header field-setting identifier, requested data contents (e.g., data contents that a user terminal requests via the GET function), and submitted data contents (e.g., data contents that the user terminal pushes via the POST function). Requested data contents and submitted data contents may be referred to as GET data contents and POST data contents, respectively.

In various embodiments, analysis server 12 analyzes whether a user terminal is a malicious access terminal based on the analytic information in the access request. To obtain analytic information from access requests, analysis server 12 may use a number of different methods.

For example, in some embodiments, analysis server 12 receives an access request sent by network server 11 or by a network component that is capable of communicating with analysis server 12, and analyzes this access request to obtain the analytic information. Analysis server 12 then determines whether the user terminal that sent the access request is a malicious access terminal based on the obtained analytic information. This method relieves the network server 11 from having to use its own resources to perform an analysis of the access request.

In some embodiments, network server 11 analyzes an access request received from a user terminal and obtains analytic information and sends the obtained analytic information to analysis server 12. Then, analysis server 12 determines whether the user terminal that sent the access request is a malicious access terminal based on the analytic information received from network server 11.

In various embodiments, analysis server 12 analyzes the analytic information (e.g., obtain via one of the aforementioned methods) according to preset decision principles for determining when a user terminal is a malicious access terminal. Examples of preset decision principles include, but are not limited to, which data contents from the identified access requests are used as data contents in the analytic information and under what circumstances (including the frequency of the data's occurrence and its parameter values) are the data contents deemed to be normal parameters or abnormal parameters of the analytic information.

In some embodiments, the preset decision principles may be configured by an administrator into analysis server 12 through a user interface that is provided by analysis server 12. The input configuration may be stored in the internal memory, flash memory, hard disk or other storage medium of analysis server 12. In embodiments where network server 11 obtains and sends analytic information to analysis server 12, the administrator can also configure the preset decision principles into network server 11 and instruct network server 11 to send the analytic information (or portions thereof) to analysis server 12 based on the preset decision principles.

In some embodiments, analysis server 12 or network server 11 may dynamically set and/or adjust the configured decision principles. To illustrate this in an example, where analytic information contains cookie contents and the decision principles concern whether the frequency of occurrence of the same cookie contents is a normal parameter, a relatively low frequency of occurrence (e.g., 1 time per minute) can be set when the network service demand is lower (e.g., during evening hours when demand is typically lower), such that during that period of relatively lower demand, when the frequency of occurrence of the cookie contents is 1 time per minute or higher, the user terminal that sent the access request will be deemed a malicious access terminal. When network service demand is higher (e.g., during day time when demand is typically higher), the frequency of occurrence can be set at a higher level (e.g., 2 times per minute), such that during the period of relatively higher demand, the user terminal that sent the access request will be considered a malicious access terminal only when the frequency of occurrence of the same cookie contents reaches 2 times per minute or higher. In some embodiments, after analysis server 12 or network server 11 dynamically adjusts the decision principles in accordance with actual conditions, it instructs the other server to update the decision principles to reflect the adjustments.

Access requests for user terminals that are deemed to be malicious access terminals may be flagged in various ways, such as using HTTP header field-setting identifiers in the obtained analytic information. If analysis server 12 determines that a user terminal is a malicious access terminal, then analysis server 12 can send the terminal identifier of this malicious access terminal to network server 11. Network server 11 adds this terminal identifier to the interception information. If the user terminal corresponding to this terminal identifier subsequently sends an access request to network server 11, then network server 11 will intercept the access request from this user terminal. Analysis server 12 can also send the HTTP header field-setting identifiers to network server 11 with instructions of whether the corresponding user terminals are malicious access terminals (e.g., a field-setting identifier of 0 indicates "non-malicious" and a field-setting identifier of 1 indicates "malicious"). Network server 11 will add the received HTTP header field-setting identifiers to the interception information. Subsequently, when a user terminal sends an access request, network server 11 will check whether the HTTP header field-setting identifier is 1. If so, network server 11 will intercept the access request. If not, network server 11 will process the access request. Moreover, network server 11 may send the access request to analysis server 12 for continued analysis.

In some embodiments, network server 11 is a web server that has an Apache function module, a lighttpd function module, or an nginx function module. System 100 shows that network server 11 includes an Apache function module, shared memory (shm function module), and a function module for synchronizing data of the Apache function module with data of analysis server 12. In some embodiments, the function module for synchronizing data of the Apache function module with the data of analysis server 12 is called a "hummock" client. A "mod_hummock" component in the Apache function module (not shown) sends the access request or the analytic information (e.g., following analysis of the access request by network server 11) through PIPE to the hummock client. In some embodiments, the hummock client then sends the access request or the analytic information through an event interface to the hummock module event interface in analysis server 12. The UDP transmission and/or TCP transmission protocol can also be used for data transmission between the two interfaces in order to increase the transmission speed. The hummock module in analysis server 12 is for receiving and analyzing access requests and for informing network server 11 of the analysis results.

The modules described above can be implemented as software components executing on one or more processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The modules may be implemented on a single device or distributed across multiple devices.

According to the decision principles that have been set, the hummock module in analysis server 12 separates the received access requests (e.g., from network server 11 or a component of network server 11) or analytic information (e.g., following network server 11's analysis of the access requests), and manages the separated information, collectively referred to as separation management. For example, the hummock module takes certain pieces of received analytic information and writes the information into a configuration table. The configuration table includes three parts: data, name list and configuration. The access data (cookie contents, field-setting identifiers, GET data contents and POST data contents) in the analytic information is written into the data part. The contents in the name list part are marked according to analysis as black-listed (or white-listed) contents. Each decision condition of the analytic information is written into the configuration part. In other words, if the analytic information contains cookie contents, then the probability for deciding whether the cookie is malicious is written in the configuration part.

The hummock module in analysis server 12 performs counting (e.g., keeping track of frequency of the contents of analytic information) and analysis of the analytic information after it has undergone separation management. Moreover, the hummock module stores the counting and analysis results in the memory of analysis server 12. For example, the hummock module counts the number of times that the IP address equals a specific address IP_1 within a certain duration of time as n1, the number of times that the IP address equals another specific address IP_2 within a certain duration of time as n2, and stores IP_1_n1 and IP_2_n2 in the memory.

The hummock module in analysis server 12 can scan the memory in which the analysis results are stored and locate the analysis results (such as IP address, cookie contents, terminal identifier, etc.) that are appropriate to be sent back to network server 11. Analysis server 12 can also periodically (e.g., every N seconds, N being a number greater than 0) scan the memory and locate analysis results that are appropriate to be sent to network server 11. For example, the procedure may be as follows: set up a timer in analysis server 12. At the end of the period set in the timer, the hummock module performs a memory scan and compares the contents stored in the memory with the preset decision principles. Analysis server 12 may instruct the hummock module to send the completed analysis results (e.g., which user terminals are malicious) to network server 11.

After analysis server 12 determines the analysis results that need to be sent back to network server 11, it can send the analysis results in several ways.

In some embodiments, the analysis results are sent through UDP transmission. Because UDP transmission is relatively unreliable, network server 11 and analysis server 12 periodically consult each other concerning the interception information version number so as to ensure that the interception information version numbers stored by network server 11 and analysis server 12 are the same. In this method, the hummock module in analysis server 12 and the hummock client in network server 11 jointly maintain the interception information. In the initial state, the versions of the interception information are the same in the two servers. Moreover, every time the interception information is updated, the method of changing the version number following an update is the same in the two servers. It is ensured that the interception information stored by network server 11 is updated promptly.

More specifically, the hummock client in network server 11 periodically sends analysis result requests (e.g., syn requests) to the hummock module in analysis server 12 via the UDP interface, and the syn requests carry the current version number of the interception information in network server 11. After the hummock module in analysis server 12 confirms the analysis results that were sent back, it uses these analysis results to update the interception information that it has stored and obtains the version number of the updated interception information. Then, the hummock module in analysis server 12 decides whether the version number of the received interception information from network server 11 is the same as the updated interception information version number that it has stored. If the current version number of the interception information from network server 11 is the same as the version number of the interception information stored in analysis server 12, then there is no need to update the interception information in network server 11. If the two version numbers are not the same, that means that the current version number of the interception information in network server 11 is lower than the version number of the interception information in analysis server 12. In that case, analysis server 12 sends the analysis results that it most recently used to update the interception information from the UDP interface by means of sending an analysis results response (e.g., a syn response) to the hummock client in network server 11.

In some embodiments, the analysis results are sent through TCP transmission. Because TCP transmission is more reliable, there is no need for data consultations between network server 11 and analysis server 12. Analysis server 12 sends the analysis results directly to network server 11. After the hummock module in analysis server 12 obtains the analysis results, the TCP interface sends them by means of analysis results response (e.g., syn response) to the hummock client in network server 11.

In the two sending methods described above, after the hummock client in network server 11 receives the analysis results, it writes them into the shm module. The Apache module in network server 11 reads the analysis results from the shm and in accordance with these analysis results, updates the interception information that it has stored. Subsequently, when network server 11 receives an access request sent from a user terminal, it can use the most recently updated interception information that it has stored to decide on the malicious status of the user terminal and thus intercept an access request that is from an identified malicious access terminal.

Figure 2:
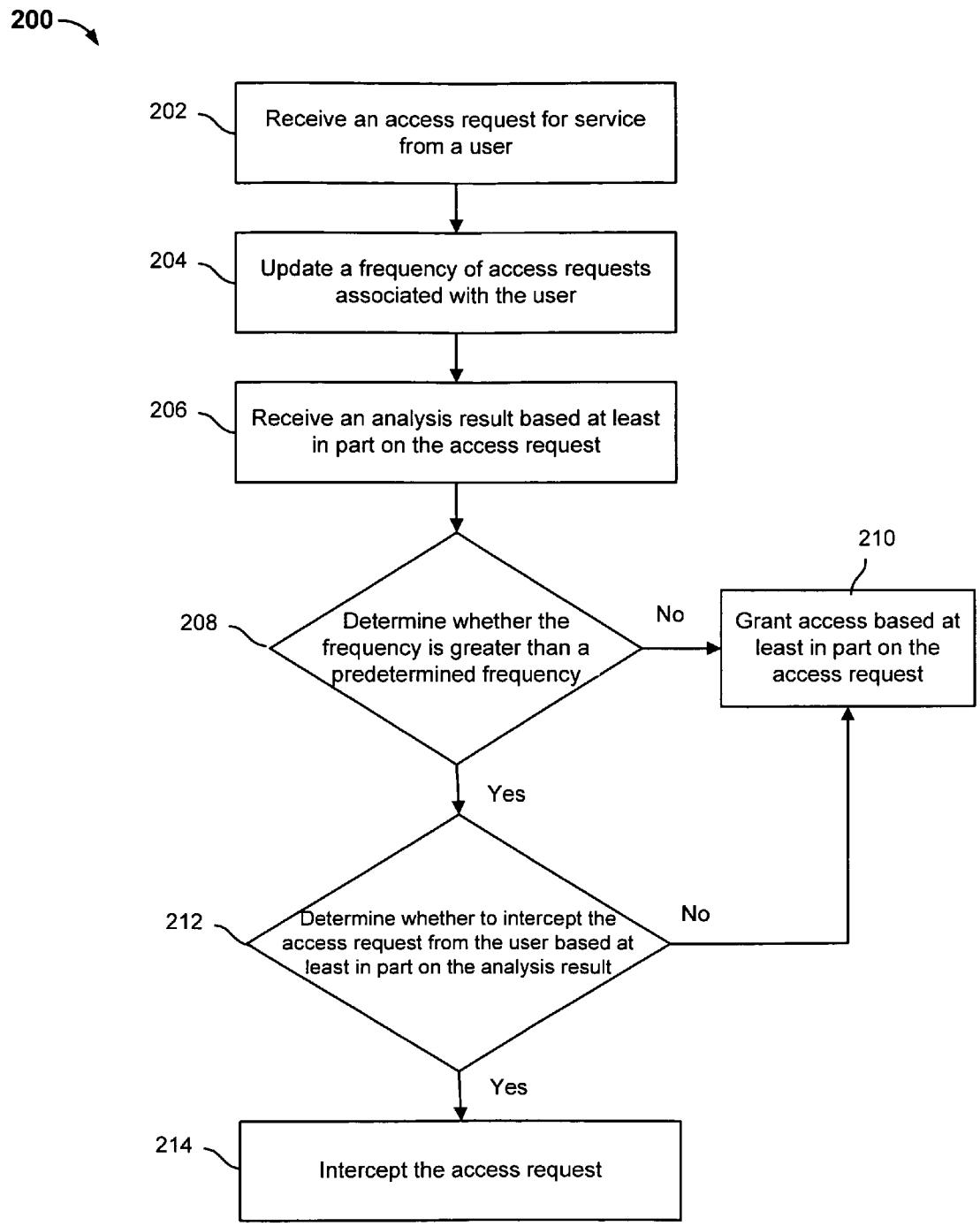
FIG. 2 is a flow diagram showing an embodiment of a process of determining whether a user terminal is a malicious access terminal.

FIG. 2 is a flow diagram showing an embodiment of a process of determining whether a user terminal is a malicious access terminal. In some embodiments, process 200 may be implemented by system 100. Process 200 includes the following steps:

Step 202: an access request for service from a user is received. As used herein, the user refers to a user terminal. In various embodiments, the access request is received by a web server (e.g., a network server). In some embodiments, the network server also forwards the access request to an analysis server.

Step 204: a frequency of access requests associated with the user is updated. In some embodiments, the network server that receives the access request maintains a counter for each user terminal from which it has previously received access request's, and updates the counter corresponding to the user terminal that sent the recently received access request.

Step 206: an analysis result based at least in part on the access request is received. In various embodiments, the analysis result is received by the network server. In various embodiments, the analysis result is generated and sent by the analysis server each time the analysis server conducts an analysis of a forwarded access request. The analysis result contains information regarding whether the user terminal that sent the access request is a malicious access terminal. In various embodiments, the network server that receives the analysis result updates/creates a new version of a set of interception information (e.g., information regarding which user terminals are malicious access terminals).

Step 208: it is determined whether the frequency of access by the user is greater than a predetermined frequency. If it is determined that the frequency is not greater than the predetermined frequency, then control passes to Step 210. If it is determined that the frequency is greater than the predetermined frequency, then control passes to Step 212.

Step 210: access is granted based at least in part on the access request. In some embodiments, the network server grants access based on the received access request. In some embodiments, the network server also forwards the access request and/or analytic information extracted from the access request to an analysis server for analysis.

Step 212: it is determined whether to intercept the access request from the user based at least in part on the analysis result. In various embodiments, the network server has interception information that identifies malicious access terminals. In various embodiments, the interception information is based/derived from the analysis results. In some embodiments, the network server will compare the access request against its interception information (e.g., check whether an identifier associated with the user is found among the interception information/malicious access terminals). If a match of (e.g., an identifier of) the access request is found among the interception information, then then control passes to Step 214. Otherwise, if a match of the access request is not found among the interception information, then control passes to Step 210.

Step 214: the access request is intercepted. In various embodiments, if the network server determines that the user terminal is found among the interception information, then it will intercept the access request and all subsequent access requests sent by the same user terminal.

To further illustrate process 200, a few examples are discussed for purposes of illustration.

In the first example, the analytic information employed by the analysis server includes cookie contents, and the interception information also includes cookie contents. When the network server receives for the $N^{th}$ (N is greater than 1) time an access request sent by the same user terminal, the following steps are taken:

First step: a analysis server has already analyzed one or more access requests among the N−1 access requests that it has received from the network server, and has obtained, following each analysis, a corresponding analysis result. The network server continually updates the contents in the interception information in accordance with the analysis results obtained following each analysis. When the network server receives an access request for the $N^{th}$ time, it can use the updated interception information to decide whether the user terminal that sent the $N^{th}$ access requests is a malicious access terminal.

Second step: The network server analyzes the received access request and compares the identified cookie contents (e.g., extracted by the network server) in the access request with cookie contents in the interception information. If the identified cookie contents match cookie contents in the interception information, it means that these cookie contents are from an access request sent by a malicious access terminal. When the user terminal is determined to be a malicious access terminal, the network server intercepts the access request. Otherwise, the network server performs the third step.

Third step: The network server processes the access request and asynchronously sends the access request to the analysis server.

Fourth step: The analysis server determines, in accordance with the cookie contents identified in every access request received (e.g., within a certain duration of time), whether the number of identified cookie contents has reached a threshold value. If the threshold value has been reached, then it is probable that the user terminal that sent the access request containing the same cookie contents is a malicious access terminal, and the fifth step is performed. Otherwise, it determines that the user terminal is not a malicious access terminal and returns to the second step.

The first threshold value may be set, for example, according to an empirical value. It may be manually set by an administrator or automatically set by the system.

Fifth step: The analysis server identifies the cookie contents as coming from a malicious access terminal to the network server.

Sixth step: The network server writes the received cookie contents into the interception information, obtains the updated interception information, and then returns to the second step. If the same user terminal sends another access request to the network server and the cookie contents in the access request match cookie contents in the interception information, the network server will then intercept this subsequent access request.

In the second example, the issue of multiple user terminals with the same IP address is addressed. One possible scenario involving multiple user terminals with the same IP address is when several user terminals all utilize a single Network Address Transfer (NAT) gateway. In this example, the analytic information employed by the analysis server includes both IP addresses and cookie contents and that the interception information also includes both IP addresses and cookie contents. When the network server receives an access request for the $N^{th}$ (N is greater than 1) time from the user terminal, the following steps are taken:

First step: The network server analyzes the received access request and compares the identified IP address in the access request with the IP address in the interception information. If the identified IP address matches the IP address in the interception information, then the identified cookie contents are compared to the cookie contents in the interception information. If the identified cookie contents match the cookie contents in the interception information, then it means that this access request is sent from a malicious access terminal and the network server will intercept the access request. Otherwise, the network server performs the second step.

Second step: The network server provides service to the user terminal that sent the access request in accordance with the access request and asynchronously sends the access request to the analysis server.

Third step: The analysis server identifies the IP address and cookie contents from every access request received within a certain duration of time. When the number of the same IP addresses that have been identified reaches a second threshold value, the analysis server next decides whether the number of the same cookie contents which have been identified among the access requests containing the same IP addresses have reached a third threshold value. If the third threshold value is also met, the analysis server determines that the user terminal that sent the access requests containing the same cookie contents is a malicious access terminal and proceeds to the fourth step. Otherwise, the process returns to the first step.

The second and third threshold values can be based on empirical values or can be manually set by an administrator.

Fourth step: The analysis server sends the IP address and cookie contents identified to be sent from a malicious access terminal to the network server.

Fifth step: The network server writes the received IP address and cookie contents into the interception information, obtains the updated interception information, and then returns to the first step. If the same user terminal sends another access request to the network server and if the IP address and cookie contents in the access request match the IP address and cookie contents in the interception information, then the network server will intercept this subsequent access request.

Figure 3:
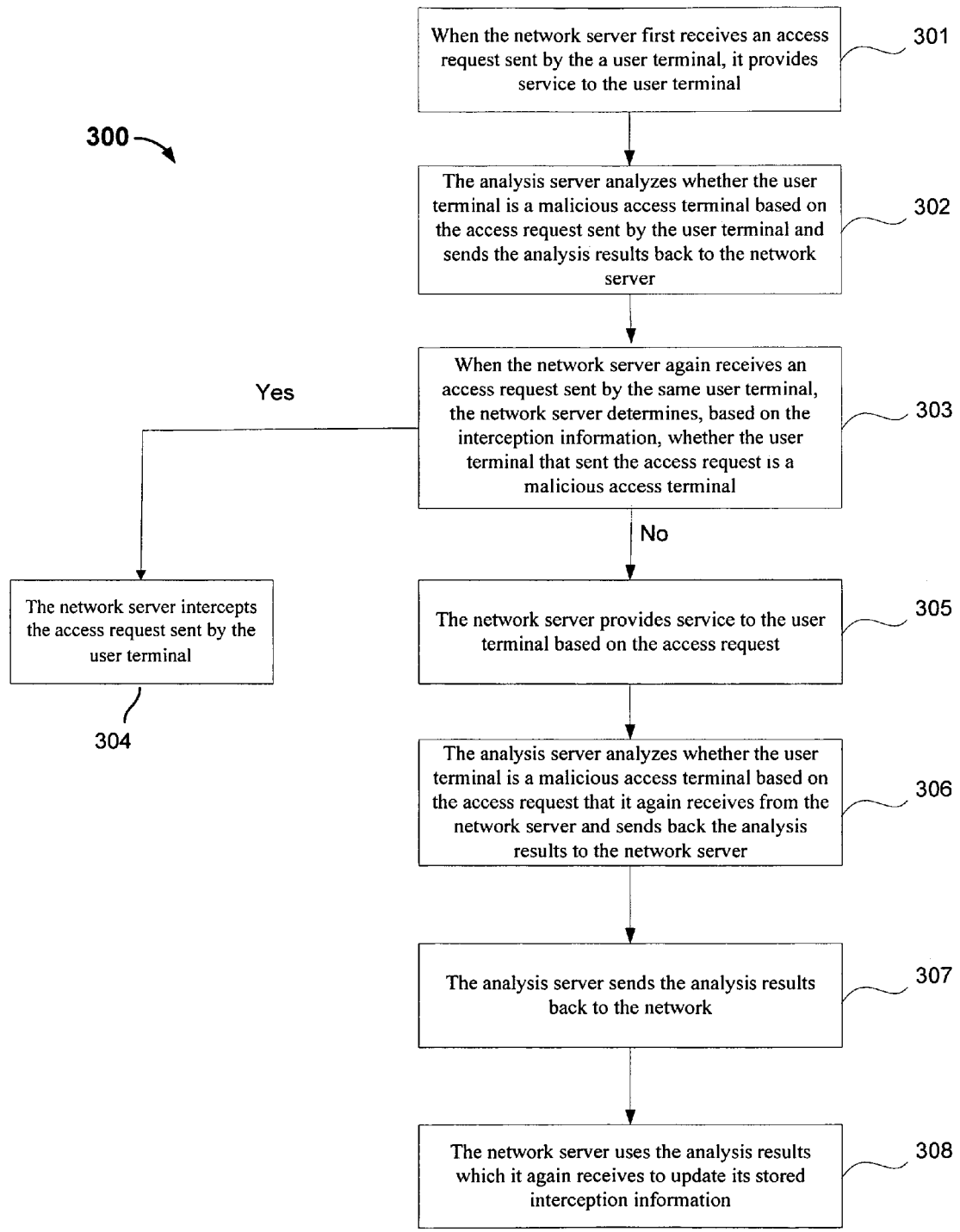
FIG. 3 is a flow diagram showing an embodiment of a process of intercepting malicious access.

FIG. 3 is a flow diagram showing an embodiment of a process of intercepting malicious access. In some embodiments, process 300 may be implemented on system 100. Process 300 includes steps:

Step 301: When the network server first receives an access request sent by a user terminal, it provides service to the user terminal. In some embodiments, the network server checks to see if the user terminal is found within the stored interception information (e.g., by comparing an identifier of the user terminal against a list of identifiers of malicious access terminals) and provides the requested service after it does not find the user terminal within the stored interception information. In various embodiments, the network server also sends the access request and/or or portion thereof (e.g., extracted analytic information) to an analysis server.

Step 302: The analysis server analyzes whether the user terminal is a malicious access terminal based on the access request sent by the user terminal and sends the analysis results back to the network server.

Step 303: When the network server again receives an access request sent by the same user terminal, the network server determines, based on the interception information, whether the user terminal that sent the access request is a malicious access terminal. If it is, then the network server performs Step 304. Otherwise, the network server performs Step 305.

The interception information is determined on the basis of the analysis results sent back by the analysis server. Specifically, the analysis server can generate the interception information based on said analysis results and send said interception information to the network server. Or the analysis server sends the analysis results back to the network server, and the network server generates the interception information on its own based on the analysis results.

The contents and version numbers of the interception information stored on the network server and on the analysis server are the same as those of the interception information stored on the network server. Also, the interception information may be synchronized between the network server and the analysis server by using the methods as described for FIG. 1.

Step 304: The network server intercepts the access request sent by the user terminal.

In order to avoid an operation error in Step 304, after the network server intercepts the access request from a identified malicious access terminal, it may immediately end the access process and forward the access request from the user terminal to an authentication server whose purpose is to verify identities. The authentication server will perform further authentication of the user terminal's identity. When it authenticates and approves the terminal, the network server may deem that the user terminal is no longer a malicious access terminal (e.g., by updating the interception information to exclude the user terminal) and then execute Step 305. Otherwise, the network server may simply end this access process.

The authentication server may authenticate the identity of the user terminal by the following method, for example: the authentication server pushes an authentication page to the user terminal and requests that the user terminal input a lawful verification code through the authentication page.

Step 305: The network server provides service to the user terminal based on the access request.

Step 306: The analysis server analyzes whether the user terminal is a malicious access terminal based on the access request that it again receives from the network server and sends back the analysis results to the network server.

In some embodiments, in step 306, the access request which the analysis server obtains can be sent to it asynchronously by the network server while network server performs Step 305. The access request can also be sent to the analysis server by a network component of the network server that can communicate with the analysis server. In some embodiments, if the network server asynchronously sends access requests to the analysis server, the network server can compress at least one unintercepted access request from among the multiple access requests that it has received and then send it to the analysis server as a way of improving sending efficiency.

Step 307: The analysis server sends the analysis results back to the network server.

Step 308: The network server uses the analysis results which it again receives to update its stored interception information.

At this point, the network server can continue to receive access requests sent by the same user terminal. If a received access request is not from the same user terminal that initially sent an access request, the network server will start the process at Step 303. If the user terminal that continues to send access requests is the user terminal that initially sent an access request to the network server, then the network server can return to Step 301.

A person skilled in the art should understand that the embodiments of the present application can be implemented as methods, systems or computer software products. Therefore, the described embodiments can take the form of entirely hardware embodiments, entirely software embodiments, or embodiments that combine hardware and software aspects. For example, C or C++ could be used to achieve optimal results. In addition, the present application can take the form of computer programs implemented on one or more computer-operable storage media (including but not limited to magnetic disk storage devices, CD-ROMs, and optical storage devices) containing computer program codes.

The present application is described with reference to flow charts and/or block diagrams based on methods, equipment (systems) and computer program products. It should be understood that each process and/or block in the flow charts and/or block diagrams, and combinations of processes and/or blocks in the flow charts and/or block diagrams, can be achieved through computer program commands. One can provide these computer commands to a general-purpose computer, a specialized computer, an embedded processor, or the processor of other programmable data equipment so as to give rise to a machine, with the result that the commands executed through the computer or processor of other programmable data equipment give rise to a device that is used to realize the functions designated by one or more processes in a flow chart and/or one or more blocks in a block diagram.

These computer program commands can also be stored on specially-operating computer-readable storage devices that can guide computers or other programmable data equipment, with the result that the commands stored on these computer-readable devices give rise to products that include command devices. These command devices realize the functions designated in one or more processes in a flow chart and/or one or more blocks in a block diagram.

These computer program commands can also be loaded onto a computer or other programmable data equipment, with the result that a series of operating steps are executed on a computer or other programmable equipment so as to give rise to computer processing. In this way, the commands executed on a computer or other programmable equipment provide steps for realizing the functions designated by one or more processes in a flow chart and/or one or more blocks in a block diagram.

Although preferred embodiments of the present application have already been described, a person skilled in the art can make other modifications or revisions to these embodiments once he grasps the basic creative concept. Therefore, the attached claims are to be interpreted as including the preferred embodiments as well as all modifications and revisions falling within the scope of the present application.

Obviously, a person skilled in the art can modify and vary the present application without departing from the spirit and scope of the present invention. Thus, if these modifications to and variations of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of analyzing network access requests, comprising:
   receiving, using a processor, an access request for service from a user, wherein the access request comprises an HTTP or HTTPS request;
   updating a frequency of access requests associated with the user;
   receiving an analysis result based at least in part on the access request, wherein the analysis result is based at least in part on analyzing analytic information extracted from the access request including determining whether the user is accessing from a malicious access device and in the event that the user is accessing from a malicious access device, writing at least a portion of the analytic information into a set of interception information, wherein the analytic information includes one or more attribute information potentially associated with corresponding one or more malicious access devices, wherein the analytic information includes one or more of the following: an IP address, cookie contents, an HTTP header field-setting identifier, requested data contents or submitted data contents;
   determining whether the frequency of access requests exceeds a predetermined frequency;
   in the event that the frequency of access requests does not exceed the predetermined frequency, allowing the access request; and in the event that the frequency of access requests is greater than the predetermined frequency, determining whether to intercept the access request from the user based at least in part on the analysis result, wherein the determination includes comparing the access request against the set of interception information, wherein in the event that a match of the access request is found among the set of interception information, intercepting the access request.

2. The method of claim 1, further comprising sending at least the portion of the analytic information to an analysis device configured to analyze the analytic information.

3. A system for analyzing access requests, comprising:
one or more processors configured to:
receive an access request for service from a user, wherein the access request comprises an HTTP or HTTPS request;
update a frequency of access requests associated with the user;
receive an analysis result based at least in part on the access request, wherein the analysis result is based at least in part on analyzing analytic information extracted from the access request including determining whether the user is accessing from a malicious access device and in the event that the user is accessing from a malicious access device, writing at least a portion of the analytic information into a set of interception information, wherein the analytic information includes one or more attribute information potentially associated with corresponding one or more malicious access devices, wherein the analytic information includes one or more of the following: an IP address, cookie contents, an HTTP header field-setting identifier, requested data contents or submitted data contents;
determine whether the frequency of access requests is greater than a predetermined frequency;
in the event that the frequency of access requests does not exceed the predetermined frequency, allowing the access request; and
in the event that the frequency of access requests is greater than the predetermined frequency, determine whether to intercept the access request from the user based at least in part on the analysis result, wherein the determination includes comparing the access request against the set of interception information, wherein in the event that a match of the access request is found among the set of interception information, intercepting the access request; and
a memory coupled to the processor and configured to provide the processor with instructions.

4. The system of claim 3, further comprising the one or more processors configured to send at least the analytic information to an analysis device configured to analyze the analytic information.

5. A computer program product for analyzing access requests, the computer program product being embodied in a non-transitory computer readable storage medium and comprising computer instructions for:
receiving an access request for service from a user, wherein the access request comprises an HTTP or HTTPS request;
updating a frequency of access requests associated with the user;
receiving an analysis result based at least in part on the access request, wherein the analysis result is based at least in part on analyzing analytic information extracted from the access request including determining whether the user is accessing from a malicious access device and in the event that the user is accessing from a malicious access device, writing at least a portion of the analytic information into a set of interception information, wherein the analytic information includes one or more attribute information potentially associated with corresponding one or more malicious access devices, wherein the analytic information includes one or more of the following: an IP address, cookie contents, an HTTP header field-setting identifier, requested data contents or submitted data contents;
determining whether the frequency of access requests is greater than a predetermined frequency;
in the event that the frequency of access requests does not exceed the predetermined frequency, allowing the access request; and
in the event that the frequency of access requests is greater than the predetermined frequency, determining whether to intercept the access request from the user based at least in part on the analysis result, wherein the determination includes comparing the access request against the set of interception information, wherein in the event that a match of the access request is found among the set of interception information, intercepting the access request.

* * * * *